United States Patent
Chao et al.

(10) Patent No.: US 11,240,507 B2
(45) Date of Patent: Feb. 1, 2022

(54) SIMPLIFIED PALETTE PREDICTOR UPDATE FOR VIDEO CODING

(71) Applicant: QUALCOMM Incorporated, San Diego, CA (US)

(72) Inventors: Yung-Hsuan Chao, San Diego, CA (US); Cheng-Teh Hsieh, Del Mar, CA (US); Marta Karczewicz, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/029,767

(22) Filed: Sep. 23, 2020

(65) Prior Publication Data

US 2021/0092393 A1    Mar. 25, 2021

Related U.S. Application Data

(60) Provisional application No. 62/905,105, filed on Sep. 24, 2019.

(51) Int. Cl.
*H04N 19/00* (2014.01)
*H04N 19/132* (2014.01)
(Continued)

(52) U.S. Cl.
CPC ......... *H04N 19/132* (2014.11); *H04N 19/146* (2014.11); *H04N 19/176* (2014.11); *H04N 19/186* (2014.11)

(58) Field of Classification Search
CPC .. H04N 19/186; H04N 19/593; H04N 19/146; H04N 19/50; H04N 19/176; H04N 19/132
See application file for complete search history.

(56) References Cited

U.S. PATENT DOCUMENTS

| | | | |
|---|---|---|---|
| 2016/0037164 A1* | 2/2016 | Joshi | H04N 19/186 |
| | | | 375/240.02 |
| 2016/0360205 A1* | 12/2016 | Chang | H04N 19/102 |

(Continued)

FOREIGN PATENT DOCUMENTS

EP    3104607 A1    12/2016

OTHER PUBLICATIONS

Chang Y-J, et al., "Non-CE1: On Maximum Palette Predictor Size", 21. JCT-VC Meeting, Jun. 19, 2015-Jun. 26, 2015, Warsaw, (Joint Collaborative Team On Videocoding of ISO/IEC JTC1/SC29/WG11 and ITU-TSG.16 ), No. JCTVC-U0097, Jun. 12, 2015 (Jun. 12, 2015), XP030241517, pp. 1-4, Retrieved from the Internet: URL:http://phenix.int-evry.fr/jct/doc_end_user/documents/21_Warsaw/wg11/JCTVC-U0097-v2.zip JCTVC-U0097r1.doc [retrieved on Jun. 12, 2015] Abstract Chapters 1-3.

(Continued)

*Primary Examiner* — Zhihan Zhou
(74) *Attorney, Agent, or Firm* — Shumaker & Sieffert, P.A.

(57) ABSTRACT

An example device includes a memory configured to store at least a portion of an encoded video bitstream; and one or more processors that are implemented in circuitry and configured to: determine, based on a parameter of a first block of video data, a maximum number of entries to be used for palette-mode coding of the current block; generate, based on the determined maximum number of entries and based on a palette predictor, a palette for the first block of video data, the palette including one or more entries each including a palette index that is associated with a color value; decode, from the encoded video bitstream and for the first block of video data, index values for samples of the first block that identify entries in the palette; and reconstruct, based on the index values, the samples of the first block.

19 Claims, 12 Drawing Sheets

(51) Int. Cl.
*H04N 19/176* (2014.01)
*H04N 19/186* (2014.01)
*H04N 19/146* (2014.01)

(56) References Cited

U.S. PATENT DOCUMENTS

2016/0360207 A1* 12/2016 Lin .................. H04N 19/96
2020/0280729 A1* 9/2020 Sun .................. H04N 19/186

OTHER PUBLICATIONS

International Search Report and Written Opinion—PCT/US2020/052509—ISA/EPO—dated Feb. 2, 2021, 22 pp.
Bross B., et al., "Versatile Video Coding (Draft 10)", JVET-S2001-vG, Joint Video Experts Team (JVET) of ITU-T SG 16 WP 3 and ISO/IEC JTC 1/SC 29/WG 11, 19th Meeting: by Teleconference, Jun. 22-Jul. 1, 2020, 548 Pages.
Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].
Chang Y-J., et al., "Non-CE1: On Maximum Palette Predictor Size", JCTVC-U0097r2, Joint Collaborative Team on Video Coding (JCT-VC) of ITU-T SG 16 WP 3 and ISO/IEC JTC 1/SC 29/WG 11, 21st Meeting, Warsaw, PL, Jun. 19-26, 2015, pp. 1-4.
Chao Y-H., et al., "CE8-2.1: Palette Mode in HEVC", JVET-O0119, 15th JVET Meeting, Jul. 3, 2019-Jul. 12, 2019, Gothenburg, (The Joint Video Exploration Team of ISO/IEC JTC1/SC29/WG11 and ITU-TSG.16 WP 3), No. JVET-O0119, Jul. 9, 2019 (Jul. 9, 2019), XP030218670, 7 Pages, Retrieved from the Internet: URL: http://phenix.int-evry.fr/ivet/doc_end_user/documents/15_Gothenburg/wg11/JVET-O0119-v3.zip JVET-O0119-v3/JVET-O0119-WD-v2.docx, JVET-O0119-V3, [retrieved on Jul. 9, 2019].
Chao Y-H., et al., "Non-CE8: Simplification of Palette Predictor Update for Small CUs", JVET-P0475, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-4.

Guo L., et al., "Palette Mode for Screen Content Coding", 13th JCT-VC Meeting, 104th MPEG Meeting, Apr. 18, 2013-Apr. 26, 2013, Incheon, KR (Joint Collaborative Team on Video Coding of ISO/IEC JTC1/SC29/WG11 and ITU-TSG.16 WP 3), URL: http://wftp3.itu.int/av-arch/jctvc-site/, No. JCTVC-M0323, Apr. 9, 2013 (Apr. 9, 2013), XP030114280, pp. 1-5, the whole document.
ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.
Joshi R., et al., "High Efficiency Video Coding (HEVC) Screen Content Coding: Draft 6", 23rd JCT-VC Meeting, Feb. 19, 2016-Feb. 26, 2016, San Diego, (Joint Collaborative Team on Video Coding of ISO/IEC JTC1/SC29/WG11 and ITU-T SG.16 WP 3), No. JCTVC-W1005-v4, Jun. 25, 2016 (Jun. 25, 2016), XP030242126, 672 pages, Retrieved from the Internet: URL: http://phenix.int-evry.fr/jct/doc_end_user/documents/23_San%20Diego/wg11/JCTVC-W1005-v4.zip.JCTVC-W1005-v4.doc [retrieved on Jun. 25, 2016].
Joshi R., et al., "Screen Content Coding Test Model 7 (SCM 7)", Joint Collaborative Team on Video Coding (JCT-VC) of ITU-T SG 16 WP 3 and ISO/IEC JTC 1/SC 29/WG 11, 23rd Meeting: San Diego, USA, Feb. 19-26, 2016, JCTVC-W1014, pp. 1-14.
Partial International Search Report—PCT/US2020/052509—ISA/EPO—dated Nov. 11, 2020 (11 pp).
Xu X., et al., "Description of Core Experiment 2 (CE2): Palette Mode Coding", JVET-P2022-v3, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-7.
Ye J., et al., "CE8: Palette Predictor List Enhancement (Test 8.2.6)", JVET-M0457-v1, Joint Video Experts Team (JVET) of ITU-T SG 16 WP 3 and ISO/IEC JTC 1/SC 29/WG 11, 13th Meeting, Marrakech, MA, Jan. 9-18, 2019, pp. 1-3.
Ye Y., et al., "CE2-related: On Maximum Palette Size of VVC", JVET-Q0291-v2, Joint Video Experts Team (JVET) of ITU-T SG 16 WP 3 and ISO/IEC JTC 1/SC 29/WG 11, 17th Meeting, Brussels, BE, Jan. 7-17, 2020, pp. 1-4.
Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

\* cited by examiner

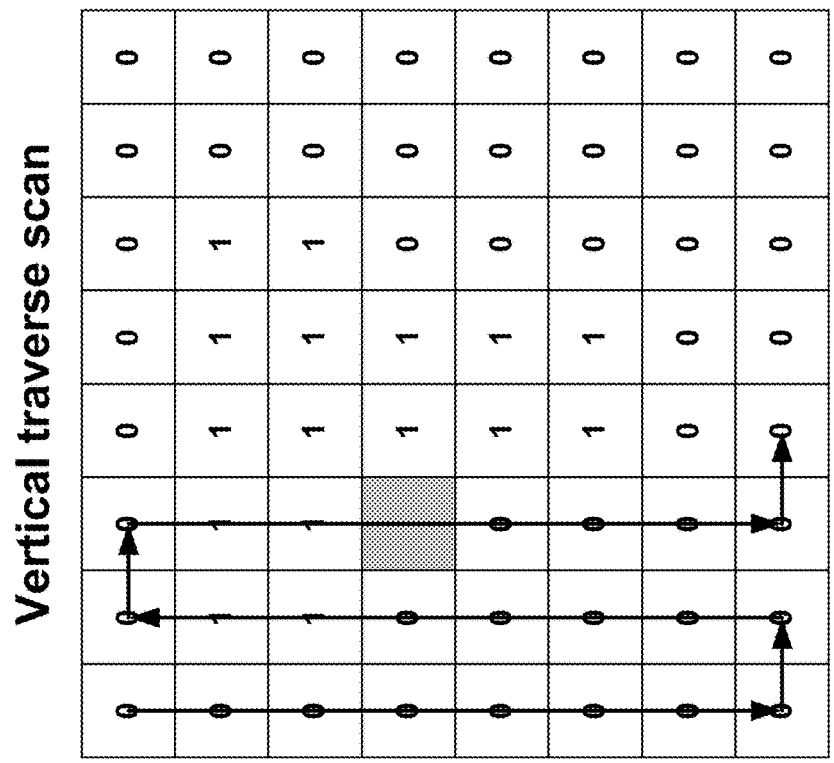
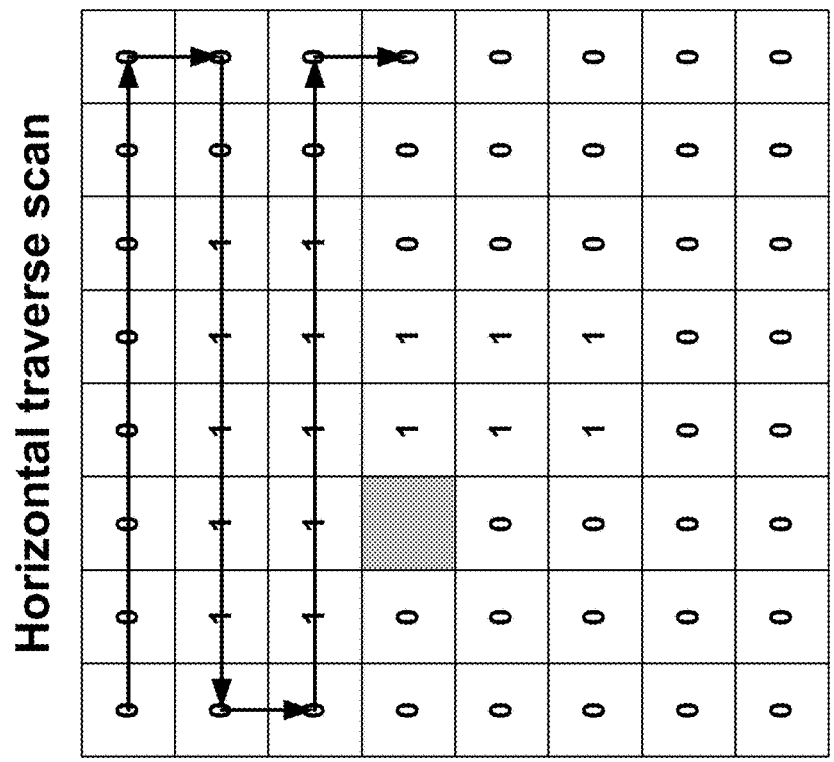
FIG. 7

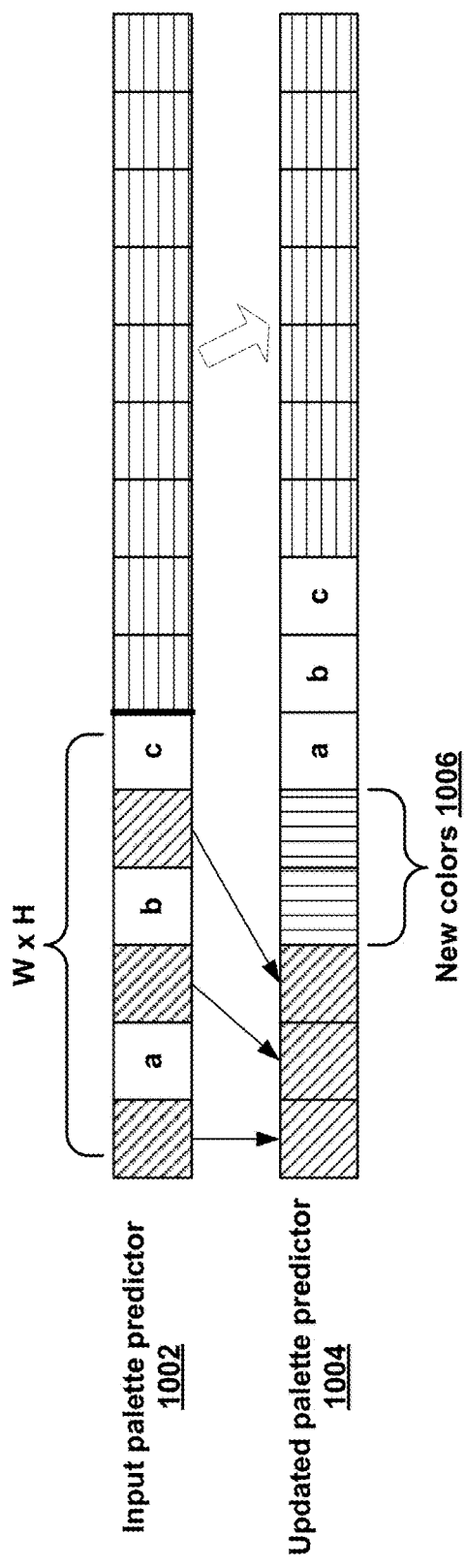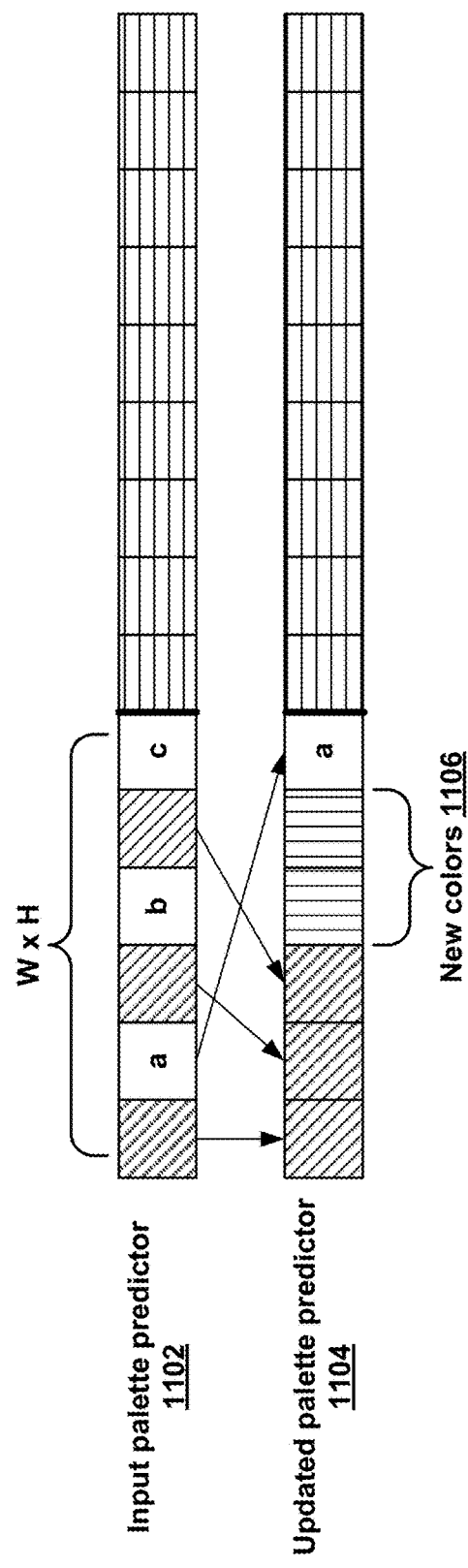

SIMPLIFIED PALETTE PREDICTOR UPDATE FOR VIDEO CODING

This application claims the benefit of U.S. Provisional Application No. 62/905,105, filed Sep. 24, 2019, the entire contents of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general this disclosure describes techniques for palette mode coding of video data. Performing palette mode coding of video data may involve copying of entries between palettes, such as copying entries from a first palette to a second palette. For instance, a video coder may copy entries from a predictor palette to a palette for a current block of video data. Each copy operation may consume system resources such as memory, processing power, and battery life in the case of a mobile or other battery-powered device. As such, it may be desirable to reduce the number of copy operations performed. The number of copy operations may be positively related to a number of entries in a palette. As such, reducing the number of entries in a palette may reduce the number of copy operations performed. However, reducing a maximum number of entries in a palette may reduce the efficiency of palette-mode coding, which may not be desirable.

In accordance with one or more techniques of this disclosure, a video coder may dynamically adjust a maximum number of entries to be used for palette-mode coding. For instance, based on a parameter of a first block of video data, a video coder may determine a number of entries to be used for palette-mode coding of the current block. As one specific example, the video coder may restrict the maximum number of entries to a first value (e.g., 16) based on the parameter having a first value or to a second value (e.g., 32) based on the parameter having a second value. Hence, in some examples, the second value is greater than the first value. In this way, the video coder may reduce the amount of system resources used for palette-mode coding. For instance, the video coder may reduce the number of copy operations without unduly reducing the efficiency of palette-mode coding.

In one example, a device includes a memory configured to store at least a portion of an encoded video bitstream; and one or more processors that are implemented in circuitry and configured to: determine, based on a parameter of a first block of video data, a maximum number of entries to be used for palette-mode coding of the current block; generate, based on the determined maximum number of entries and based on a palette predictor, a palette for the first block of video data, the palette including one or more entries each including a palette index that is associated with a color value; decode, from the encoded video bitstream and for the first block of video data, index values for samples of the first block that identify entries in the palette; and reconstruct, based on the index values, the samples of the first block.

In another example, a method includes determining, based on a parameter of a first block of video data, a maximum number of entries to be used for palette-mode coding of the current block; generating, based on the determined maximum number of entries and based on a palette predictor, a palette for the first block of video data, the palette including one or more entries each including a palette index that is associated with a color value; decoding, from an encoded video bitstream and for the first block of video data, index values for samples of the first block that identify entries in the palette; and reconstructing, based on the index values, the samples of the first block.

In another example, a device includes a memory configured to store at least a portion of an encoded video bitstream; and one or more processors that are implemented in circuitry and configured to: determine, based on a parameter of a first block of video data, a maximum number of entries to be used for palette-mode coding of the current block; generate, based on the determined maximum number of entries and based on a palette predictor, a palette for the first block of video data, the palette including one or more entries each including a palette index that is associated with a color value; and encode, in the encoded video bitstream and for the first block of video data, index values for samples of the first block that identify entries in the palette.

In another example, a method includes determining, based on a parameter of a first block of video data, a maximum number of entries to be used for palette-mode coding of the current block; generating, based on the determined maximum number of entries and based on a palette predictor, a palette for the first block of video data, the palette including one or more entries each including a palette index that is associated with a color value; and encoding, in an encoded video bitstream and for the first block of video data, index values for samples of the first block that identify entries in the palette.

In another example, a computer-readable storage medium stores instructions that, when executed, cause one or more processors of a video encoder to: determine, based on a parameter of a first block of video data, a maximum number of entries to be used for palette-mode coding of the current block; generate, based on the determined maximum number of entries and based on a palette predictor, a palette for the first block of video data, the palette including one or more entries each including a palette index that is associated with a color value; and encode, in an encoded video bitstream and for the first block of video data, index values for samples of the first block that identify entries in the palette.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 7 is a conceptual diagram illustrating example coding of indices using horizontal and vertical traverse scans.

FIG. 10 is a conceptual diagram illustrating an example of using only the first W×H entries in a palette predictor for predicting the palette predictor.

FIG. 11 is a conceptual diagram illustrating an example of using only the first W×H entries in a palette predictor for predicting the palette predictor where stuffing is restricted to the first W×H elements.

DETAILED DESCRIPTION

Figure 1:
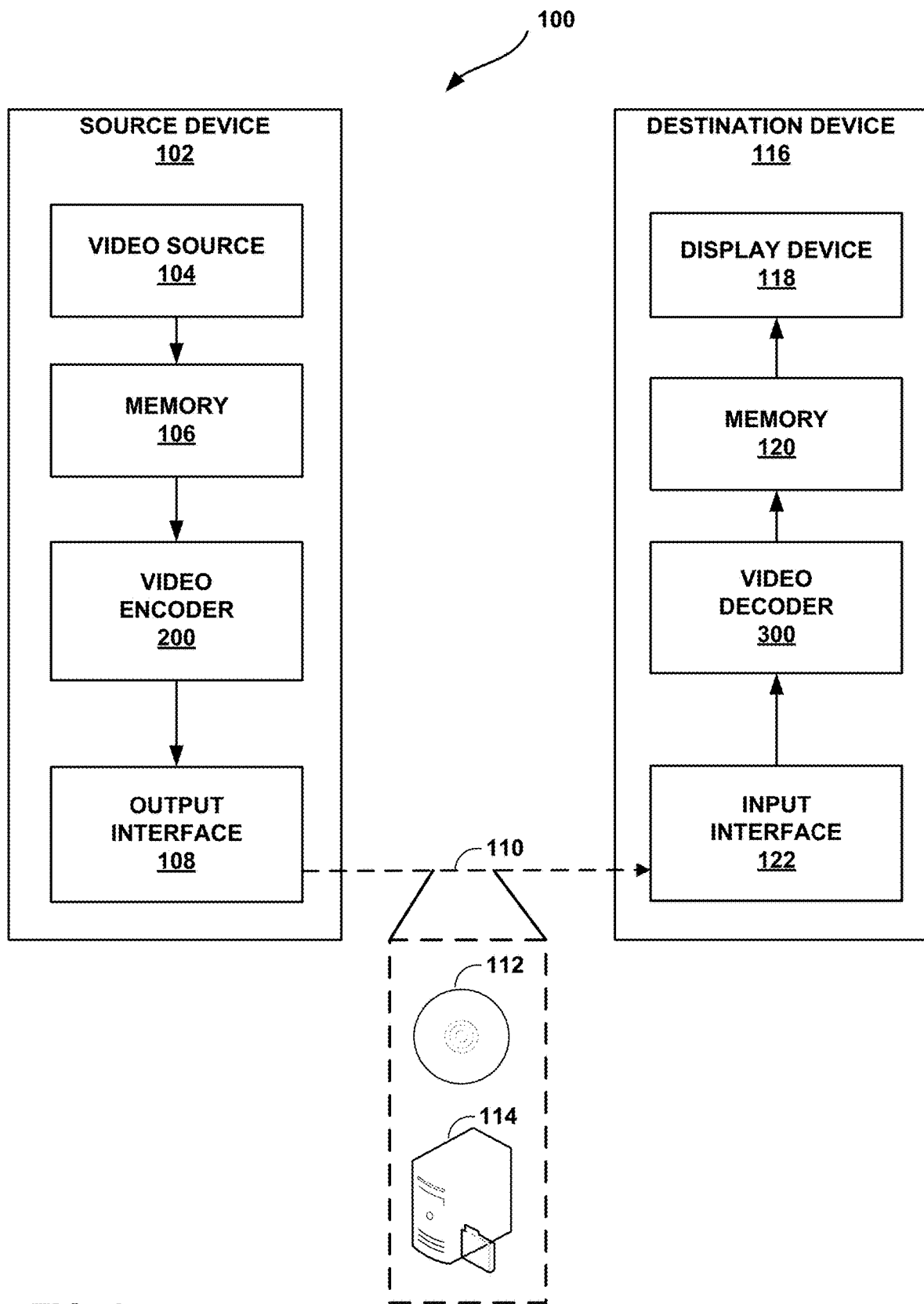
FIG. 1 is a block diagram illustrating an example video encoding and decoding system that may perform the techniques of this disclosure.

This disclosure describes techniques for video coding and compression. In particular, this disclosure describes techniques for palette-based coding of video data. For instance, this disclosure describes techniques to support coding of video content, especially screen content with palette coding, such as techniques for improved palette construction, and techniques for signaling for palette coding.

In traditional video coding, images are assumed to be continuous-tone and spatially smooth. Based on these assumptions, various tools have been developed such as block-based transform, filtering, etc., and such tools have shown good performance for natural content videos.

However, in applications like remote desktop, collaborative work and wireless display, computer generated screen content may be the dominant content to be compressed. This type of content tends to have discrete-tone and feature sharp lines, and high contrast object boundaries. The assumption of continuous-tone and smoothness may no longer apply and thus traditional video coding techniques may not be efficient ways to compress video data.

Based on the characteristics of screen content video, palette coding is introduced to improve screen content coding (SCC) efficiency as proposed in Guo et al., "Palette Mode for Screen Content Coding," Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0323, available at http://phenix.it-sudparis.eu/jct/doc_end_user/documents/13_Incheon/wg11/aCTVC-M0323-v3.zip, (hereinafter "JCTVC-M0323"). Specifically, palette coding introduces a lookup table, i.e., a color palette, to compress repetitive pixel values based on the fact that in SCC, colors within one CU usually concentrate on a few peak values. Given a palette for a specific CU, pixels within the CU are mapped to palette indices. In the second stage, an effective copy from left run length method is proposed to effectively compress the index block's repetitive pattern. In some examples, the palette index coding mode may be generalized to both copy from left and copy from above with run length coding. Note that, in some examples, no transformation process may be invoked for palette coding to avoid blurring sharp edges which can have a huge negative impact on visual quality of screen contents.

As discussed above, this disclosure describes palette-based coding, which may be particularly suitable for screen generated content coding. For example, assume a particular area of video data has a relatively small number of colors. A video coder (a video encoder or video decoder) may code a so-called "palette" as a table of colors for representing the video data of the particular area (e.g., a given block). Each pixel may be associated with an entry in the palette that represents the color of the pixel. For example, the video coder may code an index that maps the pixel value to the appropriate value in the palette.

In the example above, a video encoder may encode a block of video data by determining a palette for the block, locating an entry in the palette to represent the color value of each pixel, and encoding the palette with index values for the pixels mapping the pixel value to the palette. A video decoder may obtain, from an encoded bitstream, a palette for a block, as well as index values for the pixels of the block. The video decoder may map the index values of the pixels to entries of the palette to reconstruct the luma and chroma pixel values of the block.

The example above is intended to provide a general description of palette-based coding. In various examples, the techniques described in this disclosure may include techniques for various combinations of one or more of signaling palette-based coding modes, transmitting palettes, predicting palettes, deriving palettes, and transmitting palette-based coding maps and other syntax elements. Such techniques may improve video coding efficiency, e.g., requiring fewer bits to represent screen generated content.

For example, according to aspects of this disclosure, a video coder (video encoder or video decoder) may code one or more syntax elements for each block that is coded using a palette coding mode. For example, the video coder may code a palette_mode_flag to indicate whether a palette-based coding mode is to be used for coding a particular block. In this example, a video encoder may encode a palette_mode_flag with a value that is equal to one to specify that the block currently being encoded ("current block") is encoded using a palette mode. In this case, a video decoder may obtain the palette_mode_flag from the encoded bitstream and apply the palette-based coding mode to decode the block. In instances in which there is more than one palette-based coding mode available (e.g., there is more than one palette-based technique available for coding), one or more syntax elements may indicate one of a plurality of different palette modes for the block.

In some instances, the video encoder may encode a palette_mode_flag with a value that is equal to zero to specify that the current block is not encoded using a palette mode. In such instances, the video encoder may encode the block using any of a variety of inter-predictive, intra-predictive, or other coding modes. When the palette_mode_flag is equal to zero, the video encoder may encode additional information (e.g., syntax elements) to indicate the specific mode that is used for encoding the respective block. In some examples, as described below, the mode may be an HEVC coding mode. The use of the palette_mode_flag is described for purposes of example. In other examples, other syntax elements such as multi-bit codes may be used to indicate whether the palette-based coding mode is to be used for one or more blocks, or to indicate which of a plurality of modes are to be used.

When a palette-based coding mode is used, a palette may be transmitted by an encoder in the encoded video data bitstream for use by a decoder. A palette may be transmitted for each block or may be shared among a number of blocks in a picture or slice. The palette may refer to a number of pixel values that are dominant and/or representative for the block, including, e.g., a luma value and two chroma values.

In some examples, a syntax element, such as a transpose flag, may be coded to indicate whether a transpose process is applied to palette indices of a current palette. If the transpose flag is zero, the palette indices for samples may be coded in a horizontal traverse scan. Similarly, if the transpose flag is one, the palette indices for samples may be coded in a vertical traverse scan. This can be thought of as decoding the index values assuming horizontal traverse scan and then transposing the block (rows to columns).

As discussed above, palette coding is designed to handle the clustering colours for screen contents. Palette coding employs base colours and an index map to represent the input image block. A flag may be transmitted for each Coding unit (CU) to signal whether the palette mode is used in the current CU. If the palette mode is utilized, the pixels values in the CU are represented by a small set of representative color values. The set is referred to as the palette. For pixels with values close to the palette colors, the palette indices are signalled. For pixels with values outside the palette, the pixel is denoted with an escape symbol and the quantized pixel values are signaled directly.

To decode a palette encoded block, the decoder needs to decode palette colors and indices. Palette colors are described by a palette table and encoded by palette table coding tools. An escape flag is signaled for each CU to indicate if escape symbols are present in the current CU. If escape symbols are present, the palette table is augmented by one and the last index is assigned to the escape mode. Palette indices of all pixels in a CU form a palette index map and are encoded by palette index map coding tools.

For coding the palette index map, the video coder may code the indices using horizontal and vertical traverse scans. FIG. 7 is a conceptual diagram illustrating example coding of indices using horizontal and vertical traverse scans.

The palette indices are coded using two main palette sample modes: 'INDEX' and 'COPY_ABOVE'. The mode is signalled using a flag except for the top row when horizontal scan is used, the first column when the vertical scan is used, or when the previous mode was 'COPY_ABOVE'. In the 'COPY_ABOVE' mode, the palette index of the sample in the row above is copied. In the 'INDEX' mode, the palette index is explicitly signalled. For both 'INDEX' and 'COPY_ABOVE' modes, a run value is signalled which specifies the number pixels that are coded using the same mode.

The encoding order for index map may be as follows: First, the number of index values for the CU is signalled. This is followed by signalling of the actual index values for the entire CU using truncated binary coding. Both the number of indices as well as the index values are coded in bypass mode. This groups the index-related bypass bins together. Then the palette mode (INDEX or COPY_ABOVE) and run are signalled in an interleaved manner. Finally, the component escape values corresponding to the escape samples for the entire CU are grouped together and coded in bypass mode. An additional syntax element (e.g., last_run_type_flag) may be signalled after signalling the index values. This syntax element, in conjunction with the number of indices, may eliminate the need to signal the run value corresponding to the last run in the block.

In the 15th JVET meeting in Gothenburg, Sweden, palette mode was adopted into Versatile Video coding (VVC) for YUV4:4:4 format. The palette mode syntax is the same as in HEVC SCM (see e.g., R. Joshi, J. Xu, R. Cohen, S. Liu, Y. Ye, "Screen Content Coding Test Model 7 Encoder Description (SCM 7)", JCTVC-W1014, 2016; and R. Joshi, S. Liu, G. J. Sullivan, Y.-K. Wang, J. Xu, Y. Ye, "HEVC Screen Content Coding Draft Text 6", JCTVC-W1005, 2016) with modification of palette mode signaling and with inclusion of separated palette mode (separated palette predictor/table/syntax parsing for luma coding tree and chroma coding tree) for slices using dual tree for luma and chroma components.

In palette mode, the video coder (e.g., video encoder 200 and/or video decoder 300 as described below, e.g., with reference to FIGS. 1, 3 and 4) may code a flag for each CU to signal whether the palette mode is used in the current CU (e.g., palette_mode_flag). The maximum CU size allowed for palette mode is size 64×64 (maximum CU size in HEVC). If the palette mode is utilized, the pixels values in the CU are represented by a small set of representative color values. The set may be referred to as the palette. The video coder may signal palette indices for pixels with values close to the palette colors. The video coder may denote pixels with values outside the palette with an escape symbol, and may signal the quantized pixel values directly.

To decode a palette encoded block, the decoder may decode palette colors and indices. Palette colors are described by a palette table and encoded by palette table coding tools. The video coder may signal an escape flag for each CU to indicate if escape symbols are present in the current CU. If escape symbols are present, the video coder may augment the palette table by one and assign the last index to the escape mode. Palette indices of all pixels in a CU form a palette index map and are encoded by palette index map coding tools.

The video coder may maintain a palette predictor for coding of the palette table. The video coder may periodically initialize the palette predictor. For instance, the video coder may initialize the palette predictor at the beginning of each slice. In some examples, to initialize the palette predictor, the video coder may reset the palette predictor to 0. The video coder may signal a reuse flag for each entry in the palette predictor to indicate whether it is part of the current palette. In some examples, the video coder may code the reuse flags using run-length coding of zeros. The video coder may signal the number of new palette entries using an exponential Golomb code of order 0. The video coder may signal the component values for the new palette entries. After encoding the current CU, the video coder may update the palette predictor using the current palette. In some examples, the video coder may add entries from the previous palette predictor which are not reused in the current palette at the end of a new palette predictor until the maximum size allowed is reached. The adding of entries from the previous palette predictor may be referred to as palette stuffing.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for palette mode coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for palette mode coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or nonvolatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-v14 (hereinafter "VVC Draft 6"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
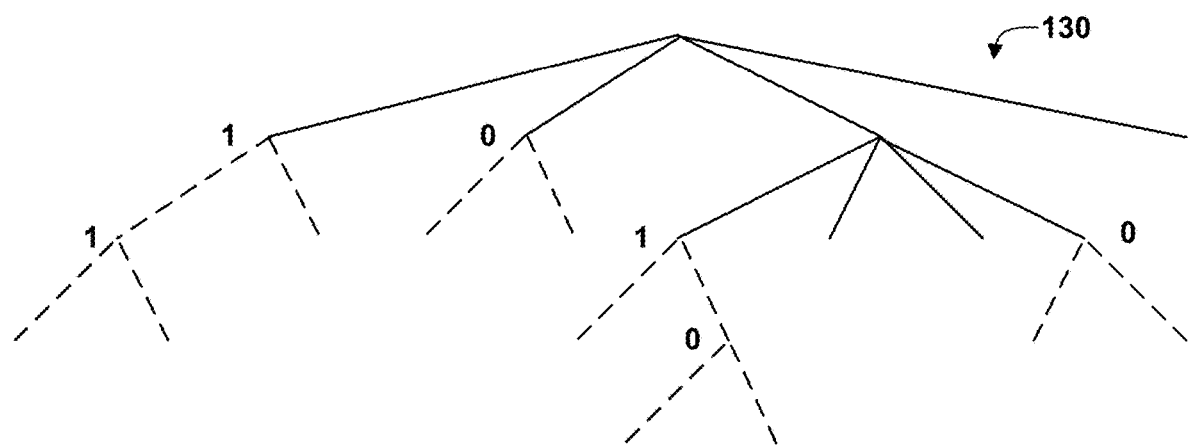
FIGS. 2A and 2B are conceptual diagrams illustrating an example quadtree binary tree (QTBT) structure, and a corresponding coding tree unit (CTU).
Figure 2B:
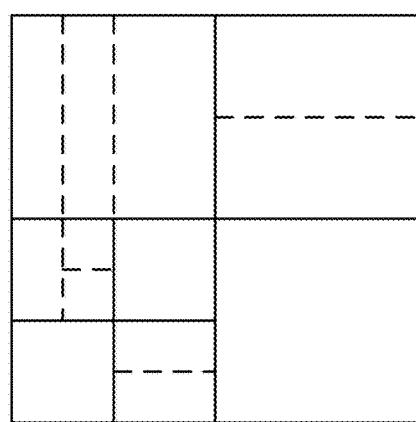

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
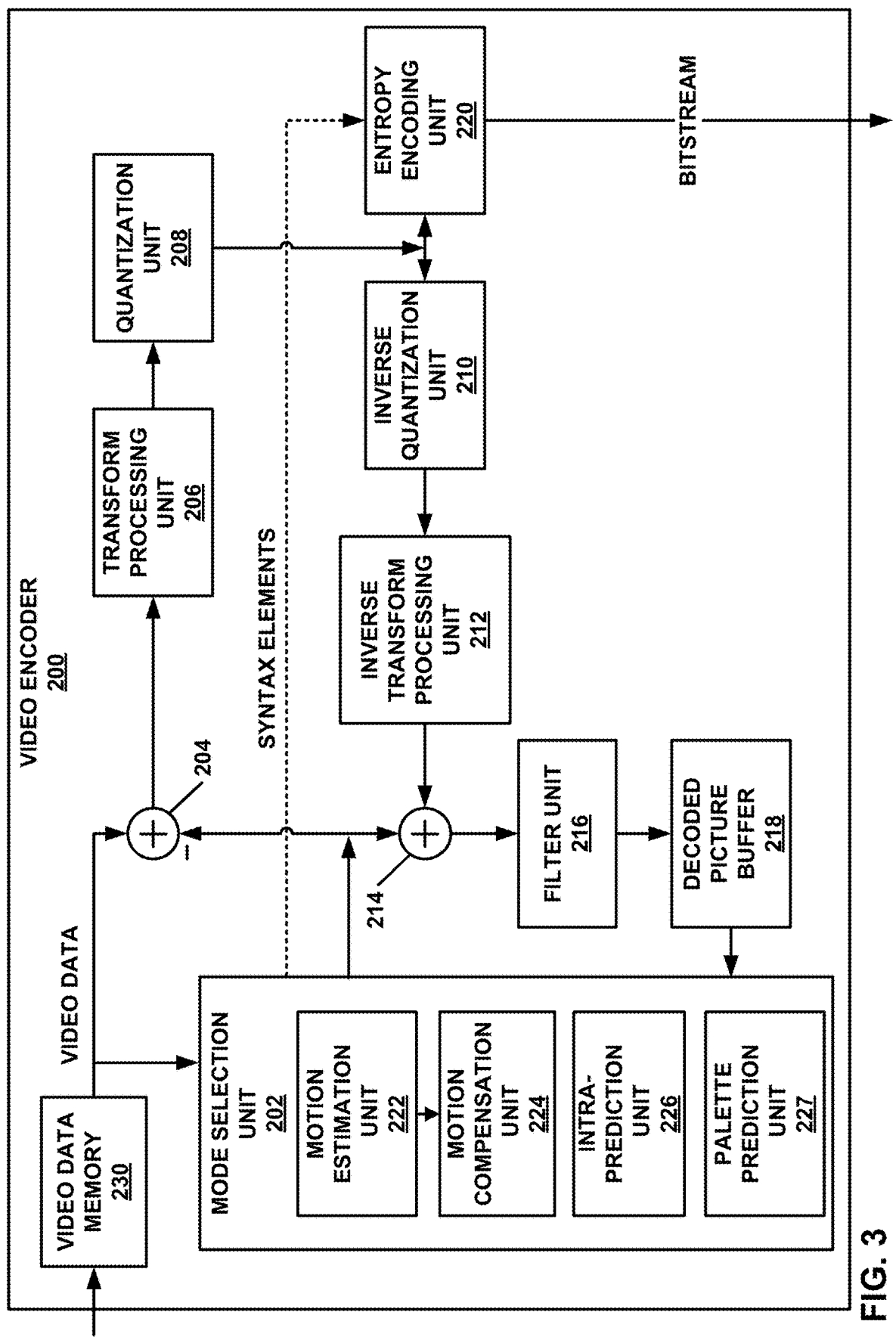
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

As shown in FIG. 3, mode selection unit 202 may include a palette prediction unit 227, which may be configured to perform video compression using palette-mode encoding. To code a current block of video data using palette-mode encoding, palette prediction unit 227 may generate a palette for the current block. The palette may include entries with color values that correspond to the mostly commonly used colors in the current block (e.g., determined using a histogram). Palette prediction unit 227 may encode a representation of the palette and index values for samples of the current block that map to entries in the palette.

In accordance with one or more techniques of this disclosure, palette prediction unit 227 may dynamically adjust a maximum number of entries to be used for palette-mode coding. For instance, based on a parameter of a first block of video data, palette prediction unit 227 may determine a number of entries to be used for palette-mode coding of the current block. As one specific example, palette prediction unit 227 may restrict the maximum number of entries to a first value (e.g., 16) based on the parameter having a first value or to a second value (e.g., 32), different that the first value, based on the parameter having a second value. Hence, in some examples, the second value is greater than the first value. In other words, palette prediction unit 227 may restrict the maximum number of entries to be either 16 or 32. In this way, palette prediction unit 227 may reduce the amount of system resources used for palette-mode coding.

Video encoder 200 represents an example of a device configured to encode video data including a memory configured to store video data, and one or more processing units implemented in circuitry and configured to determine, based on a parameter of a first block of video data, a maximum number of entries to be used for palette-mode coding of the current block; generate, based on the determined maximum size and based on a palette predictor, a palette for the first block of video data, the palette including one or more entries each including a palette index that is associated with a color value; decode, from a coded video bitstream and for the first block of video data, index values for samples of the first block that identify entries in the palette; and reconstruct, based on the index values, the samples of the first block.

Figure 4:
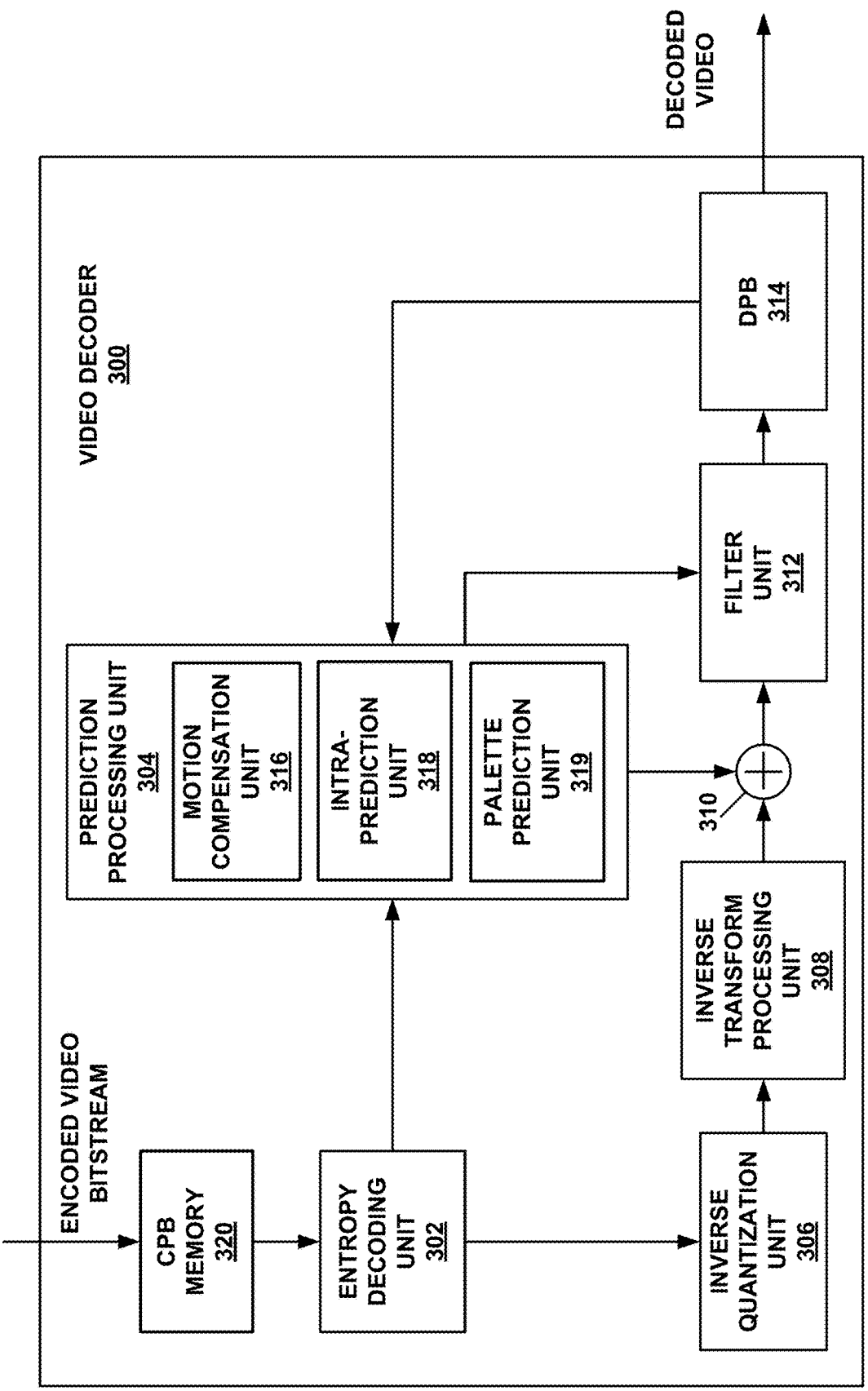
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

As shown in FIG. 4, prediction processing unit 304 may include a palette prediction unit 319, which may be configured to perform video compression using palette-mode decoding. To decode a current block of video data using palette-mode encoding, palette prediction unit 319 may generate a palette for the current block. The palette may include entries with color values that correspond to the mostly commonly used colors in the current block (e.g., determined using a histogram). Palette prediction unit 319 may decode a representation of index values for samples of the current block that map to entries in the palette. Palette prediction unit 319 may reconstruct the samples of the current block based on the index values (e.g., and any separately signalled escape samples).

In accordance with one or more techniques of this disclosure, palette prediction unit 319 may dynamically adjust a maximum number of entries to be used for palette-mode coding. For instance, based on a parameter of a first block of video data, palette prediction unit 319 may determine a number of entries to be used for palette-mode coding of the current block. As one specific example, palette prediction unit 319 may restrict the maximum number of entries to a first value (e.g., 16) based on the parameter having a first value or to a second value (e.g., 32), different than the first value, based on the parameter having a second value. In other words, palette prediction unit 319 may restrict the maximum number of entries to be either 16 or 32. Hence, in some examples, the second value is greater than the first value. In this way, palette prediction unit 319 may reduce the amount of system resources used for palette-mode coding.

In this manner, video decoder 300 represents an example of a video decoding device including a memory configured to store video data, and one or more processing units implemented in circuitry and configured to determine, based on a parameter of a first block of video data, a maximum number of entries to be used for palette-mode coding of the current block; generate, based on the determined maximum size and based on a palette predictor, a palette for the first block of video data, the palette including one or more entries each including a palette index that is associated with a color value; decode, from a coded video bitstream and for the first block of video data, index values for samples of the first block that identify entries in the palette; and reconstruct, based on the index values, the samples of the first block.

Figure 5:
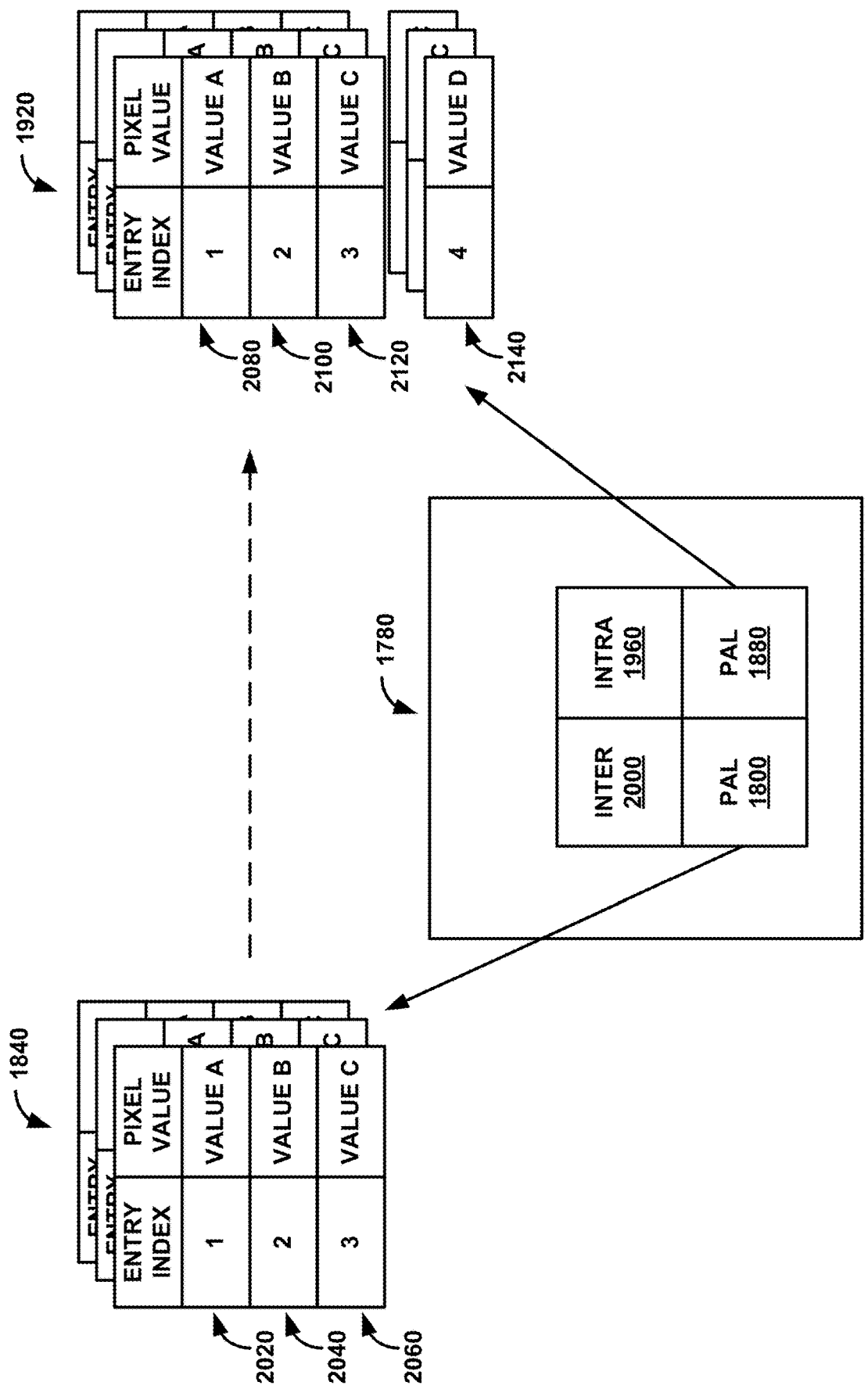
FIG. 5 is a conceptual diagram illustrating an example of determining a palette for coding video data, consistent with techniques of this disclosure.

FIG. 5 is a conceptual diagram illustrating an example of determining a palette for coding video data, consistent with techniques of this disclosure. The example of FIG. 5 includes a picture 1780 having a first coding unit (CU) 1800 that is associated with first palettes 1840 and a second CU 1880 that is associated with second palettes 1920. As described in greater detail below and in accordance with the techniques of this disclosure, second palettes 1920 are based on first palettes 1840. Picture 1780 also includes block 1960 coded with an intra-prediction coding mode and block 2000 that is coded with an inter-prediction coding mode.

The techniques of FIG. 5 are described in the context of video encoder 200 (FIG. 1 and FIG. 2) and video decoder 300 (FIG. 1 and FIG. 4) and with respect to the HEVC Standard for purposes of explanation. However, it should be understood that the techniques of this disclosure are not limited in this way, and may be applied by other video coding processors and/or devices in other video coding processes and/or standards (e.g., VVC).

In general, a palette refers to a number of pixel values that are dominant and/or representative for a CU currently being coded, such as CU 1880 in the example of FIG. 5. First palettes 1840 and second palettes 1920 are shown as including multiple palettes. In some examples, a video coder (such as video encoder 200 or video decoder 300) may code palettes separately for each color component of a CU. For example, video encoder 200 may encode a palette for a luma (Y) component of a CU, another palette for a chroma (U) component of the CU, and yet another palette for the chroma (V) component of the CU. In this example, entries of the Y palette may represent Y values of pixels of the CU, entries of the U palette may represent U values of pixels of the CU, and entries of the V palette may represent V values of pixels of the CU. In another example, video encoder 20 may encode a palette for a luma (Y) component of a CU, and another palette for two components (U, V) of the CU. In this example, entries of the Y palette may represent Y values of pixels of the CU, and entries of the U-V palette may represent U-V value pairs of pixels of the CU.

In other examples, video encoder 200 may encode a single palette for all color components of a CU. In this example, video encoder 200 may encode a palette having an i-th entry that is a triple value, including Yi, Ui, and Vi. In this case, the palette includes values for each of the components of the pixels. Accordingly, the representation of palettes 1840 and 1920 as a set of palettes having multiple individual palettes is merely one example and not intended to be limiting.

In the example of FIG. 5, first palettes 1840 includes three entries 2020-2060 having entry index value 1, entry index value 2, and entry index value 3, respectively. Entries 2020-2060 relate the index values to pixel values including pixel value A, pixel value B, and pixel value C, respectively. As described herein, rather than coding the actual pixel values of first CU 180, a video coder (such as video encoder 200 or video decoder 300) may use palette-based coding to code the pixels of the block using the indices 1-3. That is, for each pixel position of first CU 1800, video encoder 200 may encode an index value for the pixel, where the index value is associated with a pixel value in one or more of first palettes 1840. Video decoder 300 may obtain the index values from a bitstream and reconstruct the pixel values using the index values and one or more of first palettes 1840. Thus, first palettes 1840 are transmitted by video encoder 200 in an encoded video data bitstream for use by video decoder 300 in palette-based decoding. In general, one or more palettes may be transmitted for each CU or may be shared among different CUs.

Video encoder 200 and video decoder 300 may determine second palettes 1920 based on first palettes 1840. For example, video encoder 200 may encode a pred_palette_flag for each CU (including, as an example, second CU 1880) to indicate whether the palette for the CU is predicted from one or more palettes associated with one or more other CUs, such as neighboring CUs (spatially or based on scan order) or the most frequent samples of a causal neighbor. For example, when the value of such a flag is equal to one, video decoder 300 may determine that second palettes 1920 for second CU 1880 are predicted from one or more already decoded palettes and therefore no new palettes for second CU 1880 are included in a bitstream containing the pred_palette_flag. When such a flag is equal to zero, video decoder 300 may determine that palette 1920 for second CU 1880 is included in the bitstream as a new palette. In some examples, pred_palette_flag may be separately coded for each different color component of a CU (e.g., three flags, one for Y, one for U, and one for V, for a CU in YUV video). In other examples, a single pred_palette_flag may be coded for all color components of a CU.

In the example above, the pred_palette_flag is signaled per-CU to indicate whether any of the entries of the palette for the current block are predicted. In some examples, one or more syntax elements may be signaled on a per-entry basis. That is, a flag may be signaled for each entry of a palette predictor to indicate whether that entry is present in the current palette. As noted above, if a palette entry is not predicted, the palette entry may be explicitly signaled.

When determining second palettes 1920 relative to first palettes 1840 (e.g., pred_palette_flag is equal to one), video encoder 200 and/or video decoder 300 may locate one or more blocks from which the predictive palettes, in this example first palettes 1840, are determined. The predictive palettes may be associated with one or more neighboring CUs of the CU currently being coded (e.g., such as neighboring CUs (spatially or based on scan order) or the most frequent samples of a causal neighbor), i.e., second CU 1880. The palettes of the one or more neighboring CUs may be associated with a predictor palette. In some examples, such as the example illustrated in FIG. 5, video encoder 200 and/or video decoder 300 may locate a left neighboring CU, first CU 1800, when determining a predictive palette for second CU 1880. In other examples, video encoder 200 and/or video decoder 300 may locate one or more CUs in other positions relative to second CU 1880, such as an upper CU, CU 1960.

Video encoder 200 and/or video decoder 300 may determine a CU for palette prediction based on a hierarchy. For example, video encoder 200 and/or video decoder 300 may initially identify the left neighboring CU, first CU 1800, for palette prediction. If the left neighboring CU is not available for prediction (e.g., the left neighboring CU is coded with a mode other than a palette-based coding mode, such as an intra-prediction more or intra-prediction mode, or is located at the left-most edge of a picture or slice) video encoder 200 and/or video decoder 300 may identify the upper neighboring CU, CU 1960. Video encoder 200 and/or video decoder 300 may continue searching for an available CU according to a predetermined order of locations until locating a CU having a palette available for palette prediction. In some examples, video encoder 200 and/or video decoder 300 may determine a predictive palette based on multiple blocks and/or reconstructed samples of a neighboring block.

While the example of FIG. 5 illustrates first palettes 1840 as predictive palettes from a single CU, first CU 1800, in other examples, video encoder 200 and/or video decoder 300 may locate palettes for prediction from a combination of neighboring CUs. For example, video encoder 200 and/or video decoder may apply one or more formulas, functions, rules or the like to generate a palette based on palettes of one or a combination of a plurality of neighboring CUs.

In still other examples, video encoder 200 and/or video decoder 300 may construct a candidate list including a number of potential candidates for palette prediction. A pruning process may be applied at both video encoder 200 and video decoder 300 to remove duplicated candidates in the list. In such examples, video encoder 200 may encode an index to the candidate list to indicate the candidate CU in the list from which the current CU used for palette prediction is selected (e.g., copies the palette). Video decoder 300 may construct the candidate list in the same manner, decode the index, and use the decoded index to select the palette of the corresponding CU for use with the current CU.

In an example for purposes of illustration, video encoder 200 and video decoder 300 may construct a candidate list that includes one CU that is positioned above the CU currently being coded and one CU that is positioned to the left of the CU currently being coded. In this example, video encoder 200 may encode one or more syntax elements to indicate the candidate selection. For example, video encoder 200 may encode a flag having a value of zero to indicate that the palette for the current CU is copied from the CU positioned to the left of the current CU. Video encoder 200 may encode the flag having a value of one to indicate that the palette for the current CU is copied from the CU positioned above the current CU. Video decoder 300 decodes the flag and selects the appropriate CU for palette prediction.

In still other examples, video encoder 200 and/or video decoder 300 determine the palette for the CU currently being coded based on the frequency with which sample values included in one or more other palettes occur in one or more neighboring CUs. For example, video encoder 200 and/or video decoder 300 may track the colors associated with the most frequently used index values during coding of a predetermined number of CUs. Video encoder 200 and/or video decoder 300 may include the most frequently used colors in the palette for the CU currently being coded.

In some examples, video encoder 200 and/or video decoder 300 may perform entry-wise based palette prediction. For example, video encoder 200 may encode one or more syntax elements, such as one or more flags, for each entry of a predictive palette indicating whether the respective predictive palette entries are reused in the current palette (e.g., whether pixel values in a palette of another CU are reused by the current palette). In this example, video encoder 200 may encode a flag having a value equal to one for a given entry when the entry is a predicted value from a predictive palette (e.g., a corresponding entry of a palette associated with a neighboring CU). Video encoder 200 may encode a flag having a value equal to zero for a particular entry to indicate that the particular entry is not predicted from a palette of another CU. In this example, video encoder 200 may also encode additional data indicating the value of the non-predicted palette entry.

In the example of FIG. 5, second palettes 1920 includes four entries 2080-2140 having entry index value 1, entry index value 2, entry index value 3, and entry index 4, respectively. Entries 2080-2140 relate the index values to pixel values including pixel value A, pixel value B, pixel value C, and pixel value D, respectively. Video encoder 200 and/or video decoder 300 may use any of the above-described techniques to locate first CU 1800 for purposes of palette prediction and copy entries 1-3 of first palettes 184 to entries 1-3 of second palettes 1920 for coding second CU 1880. In this way, video encoder 200 and/or video decoder 300 may determine second palettes 192 based on first palettes 184. In addition, video encoder 200 and/or video decoder 300 may code data for entry 4 to be included with second palettes 1920. Such information may include the number of palette entries not predicted from a predictor palette and the pixel values corresponding to those palette entries.

In some examples, according to aspects of this disclosure, one or more syntax elements may indicate whether palettes, such as second palettes 1920, are predicted entirely from a predictive palette (shown in FIG. 5 as first palettes 1840, but which may be composed of entries from one or more blocks) or whether particular entries of second palettes 1920 are predicted. For example, an initial syntax element may indicate whether all of the entries are predicted. If the initial syntax element indicates that not all of the entries are predicted (e.g., a flag having a value of 0), one or more additional syntax elements may indicate which entries of second palettes 1920 are predicted from the predictive palette.

Figure 6:
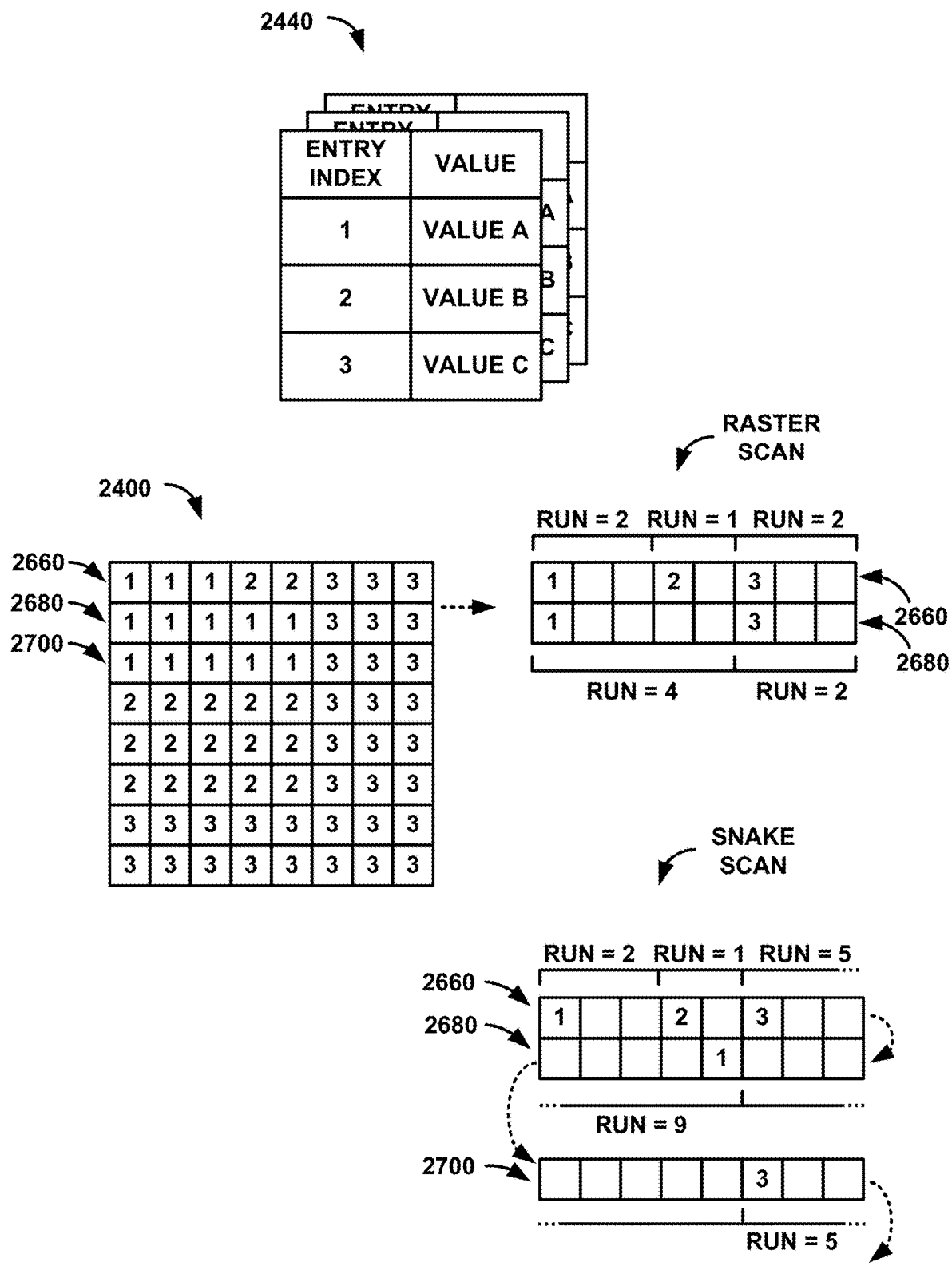
FIG. 6 is a conceptual diagram illustrating an example of determining indices to a palette for a block of pixels, consistent with techniques of this disclosure.

FIG. 6 is a conceptual diagram illustrating an example of determining indices to a palette for a block of pixels, consistent with techniques of this disclosure. For example, FIG. 6 includes a map 2400 of index values (values 1, 2, and 3) that relate respective positions of pixels associated with the index values to an entry of palettes 2440. Palettes 2440 may be determined in a similar manner as first palettes 1840 and second palettes 1920 described above with respect to FIG. 5.

Again, the techniques of FIG. 6 are described in the context of video encoder 200 (FIG. 1 and FIG. 3) and video decoder 300 (FIG. 1 and FIG. 4) and with respect to the HEVC video coding standard for purposes of explanation. However, it should be understood that the techniques of this disclosure are not limited in this way, and may be applied by other video coding processors and/or devices in other video coding processes and/or standards (e.g., VVC).

While map 2400 is illustrated in the example of FIG. 6 as including an index value for each pixel position, it should be understood that in other examples, not all pixel positions may be associated with an index value relating the pixel value to an entry of palettes 2440. That is, as noted above, in some examples, video encoder 200 may encode (and video decoder 300 may obtain, from an encoded bitstream) an indication of an actual pixel value (or its quantized version) for a position in map 2400 if the pixel value is not included in palettes 2440.

In some examples, video encoder 200 and video decoder 300 may be configured to code an additional map indicating which pixel positions are associated with index values. For example, assume that the (i, j) entry in the map corresponds to the (i, j) position of a CU. Video encoder 200 may encode one or more syntax elements for each entry of the map (i.e., each pixel position) indicating whether the entry has an associated index value. For example, video encoder 200 may encode a flag having a value of one to indicate that the pixel value at the (i, j) location in the CU is one of the values in palettes 2440. Video encoder 200 may, in such an example, also encode a palette index (shown in the example of FIG. 6 as values 1-3) to indicate that pixel value in the palette and to allow video decoder to reconstruct the pixel value. In instances in which palettes 2440 include a single entry and associated pixel value, video encoder 200 may skip the signaling of the index value. Video encoder 200 may encode the flag to have a value of zero to indicate that the pixel value at the (i, j) location in the CU is not one of the values in palettes 2440. In this example, video encoder 200 may also encode an indication of the pixel value for use by video decoder 300 in reconstructing the pixel value. In some instances, the pixel value may be coded in a lossy manner.

The value of a pixel in one position of a CU may provide an indication of values of one or more other pixels in other positions of the CU. For example, there may be a relatively high probability that neighboring pixel positions of a CU will have the same pixel value or may be mapped to the same index value (in the case of lossy coding, in which more than one pixel value may be mapped to a single index value).

Accordingly, video encoder 200 may encode one or more syntax elements indicating a number of consecutive pixels or index values in a given scan order that have the same pixel value or index value. As noted above, the string of like-valued pixel or index values may be referred to herein as a run. In an example for purposes of illustration, if two consecutive pixels or indices in a given scan order have different values, the run is equal to zero. If two consecutive pixels or indices in a given scan order have the same value but the third pixel or index in the scan order has a different value, the run is equal to one. For three consecutive indices or pixels with the same value, the run is two, and so forth. Video decoder 300 may obtain the syntax elements indicating a run from an encoded bitstream and use the data to determine the number of consecutive locations that have the same pixel or index value.

The number of indices that may be included in a run may be impacted by the scan order. For example, consider a raster scan of lines 2660, 2680, and 2700 of map 2400. Assuming a horizontal, left to right scan direction (such as a raster scanning order), row 2660 includes three index values of "1," two index values of "2," and three index values of "3." Row 2680 includes five index values of "1" and three index values of "3." In this example, for row 2660, video encoder 200 may encode syntax elements indicating that the first value of row 2660 (the leftmost value of the row) is 1 with a run of 2, followed by an index value of 2 with a run of 1, followed by an index value of 3 with a run of 2. Following the raster scan, video encoder 200 may then begin coding row 2680 with the leftmost value. For example, video encoder 200 may encode syntax elements indicating that the first value of row 2680 is 1 with a run of 4, followed by an index value of 3 with a run of 2. Video encoder 200 may proceed in the same manner with line 2700.

Hence, in the raster scan order, the first index of a current line may be scanned directly after the last index of a previous line. However, in some examples, it may not be desirable to scan the indices in a raster scan order. For instance, it may not be desirable to scan the indices in a raster scan order where a first line of a block of video data (e.g., row 2660) includes a first pixel adjacent to a first edge of the block of video data (e.g., the left most pixel of row 2660, which has an index value of 1) and a last pixel adjacent to a second edge of the block of video data (e.g., the right most pixel of row 2660, which has an index value of 3), a second line of the block of video data (e.g., row 2680) includes a first pixel adjacent to the first edge of the block of video data (e.g., the left most pixel of row 2680, which has an index value of 1) and a last pixel adjacent to the second edge of the block of video data (e.g., the right most pixel of row 2680, which has an index value of 3), the last pixel of the first line is adjacent to the last pixel of the second line, and the first edge and the second edge are parallel, and the last pixel in the first line has the same index value as the last pixel in the second line, but has a different index value from the first pixel in the second line. This situation (i.e., where the index value of last pixel in the first line is the same as the last pixel in the second line, but different from the first pixel in the second line) may occur more frequently in computer generated screen content than other types of video content.

In some examples, video encoder 200 may utilize a snake scan order (e.g., a traverse scan order) when encoding the indices of the map. For instance, video encoder 200 may scan the last pixel of the second line directly after the last pixel of the first line. In this way, video encoder 200 may improve the efficiency of run-length coding.

For example, as opposed to using a raster scan order, video encoder 200 may use a snake scan order to code the values of map 2400. In an example for purposes of illustration, consider rows 2660, 2680, and 2700 of map 2400. Using a snake scan order (such as a snake scanning order), video encoder 200 may code the values of map 2400 beginning with the left position of row 2660, proceeding through to the right most position of row 2660, moving down to the left most position of row 2680, proceeding through to the left most position of row 2680, and moving down to the left most position of row 2700. For instance, video encoder 200 may encode one or more syntax elements indicating that the first position of row 2660 is one and that the next run of two consecutive entries in the scan direction are the same as the first position of row 2660.

Video encoder 200 may encode one or more syntax elements indicating that the next position of row 2660 (i.e., the fourth position, from left to right) is two and that the next consecutive entry in the scan direction are the same as the fourth position of row 2660. Video encoder 200 may encode one or more syntax elements indicating that the next position of row 2660 (i.e., the sixth position) is three and that the next run of five consecutive entries in the scan direction are the same as the sixth position of row 2660. Video encoder 200 may encode one or more syntax elements indicating that the next position in the scan direction (i.e., the fourth position of row 268, from right to left) of row 2680 is one and that the next run of nine consecutive entries in the scan direction are the same as the fourth position of row 2680.

In this way, by using a snake scan order, video encoder 200 may encode longer length runs, which may improve coding efficiency. For example, using the raster scan, the final run of row 2660 (for the index value 3) is equal to 2. Using the snake scan, however, the final run of row 2660 extends into row 2680 and is equal to 5.

Video decoder 300 may receive the syntax elements described above and reconstruct rows 2660, 2680, and 2700. For example, video decoder 300 may obtain, from an encoded bitstream, data indicating an index value for a position of map 2400 currently being coded. Video decoder 300 may also obtain data indicating the number of consecutive positions in the scan order having the same index value.

As discussed above, the video coder may code the indices of the palette index map using horizontal and vertical traverse scans (e.g., as shown in FIG. 7). In some examples, the video coder may signal a syntax element that explicitly indicates the scan order (e.g., palette_transpose_flag).

The video coder may code the palette indices using two main palette sample modes: 'INDEX' and 'COPY_ABOVE'. The video coder may signal which mode is used. For instance, the mode is signaled using a flag except for the top row when horizontal scan is used, the first column when the vertical scan is used, or when the previous mode was 'COPY_ABOVE'. In the 'COPY_ABOVE' mode, the palette index of the sample in the row above may be copied. In the 'INDEX' mode, the palette index is explicitly signaled. For both 'INDEX' and 'COPY_ABOVE' modes, a run value may be signaled which specifies the number pixels that are coded using the same mode.

The video coder may utilize a specific coding order for the index map. One example coding order for index map is as follows: First, the number of index values for the CU may be signaled. This may be followed by signaling of the actual index values for the entire CU using truncated binary coding. Both the number of indices as well as the index values may be coded in bypass mode. This groups the index-related bypass bins together. Then the palette mode (INDEX or COPY_ABOVE) and run are signaled in an interleaved manner. Finally, the component escape values corresponding to the escape samples for the entire CU may be grouped together and coded in bypass mode. An additional syntax element, last_run_type_flag, may be signaled after signaling the index values. This syntax element, in conjunction with the number of indices, may eliminate the need to signal the run value corresponding to the last run in the block.

Figure 8:
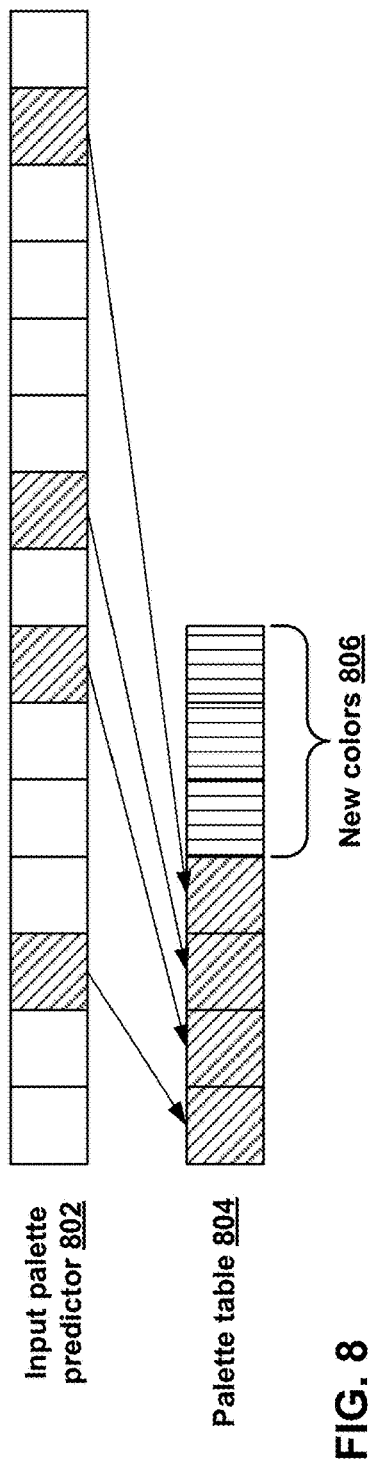
FIGS. 8 and 9 are conceptual diagrams illustrating palette table derivation and updating of a palette predictor.
Figure 9:
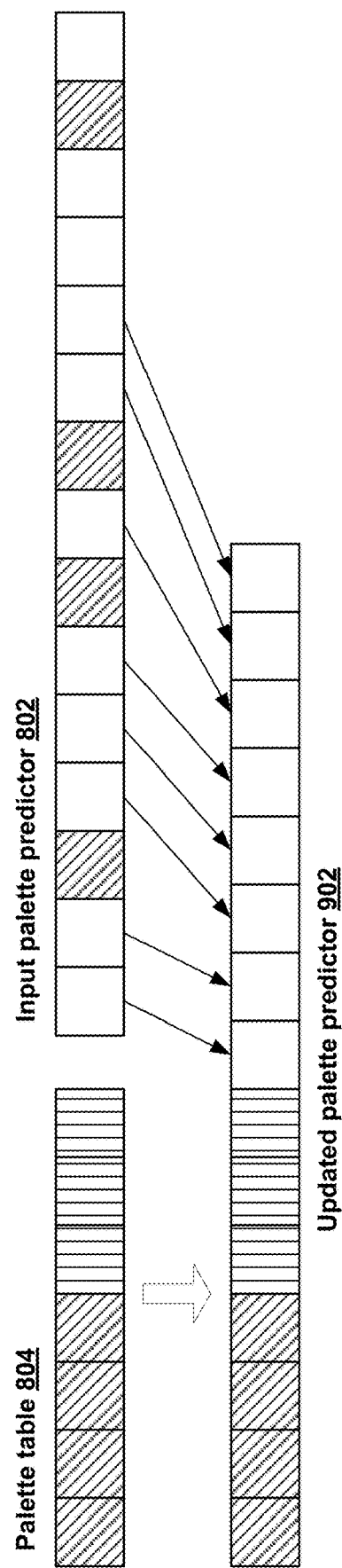

As discussed above, the video coder may maintain a palette predictor, with maximum size equivalent to 63 in Virtual Test Model 6.0 of VVC (VTM6.0), for coding the palette table. After processing a palette coding unit (CU), the video coder may update the palette predictor with the palette table of the CU, which may include the entries predicted from the previous palette predictor and the new signaled colours, and the predictor entries (from the previous palette predictor) which are not used to predict the palette table will be inserted at the end of the updated predictor until the maximum predictor size is reached. As discussed above, the latter process may be referred to as palette stuffing. FIGS. 8 and 9 are conceptual diagrams illustrating palette table derivation and updating of a palette predictor.

As shown in FIG. 8, palette table 804 may be derived from input palette predictor 802. For instance, a video decoder may determine a binary flag for each respective entry of input palette predictor 802 indicating whether the respective entry is to be included in palette table 802. In the example of FIG. 8, the video decoder may determine, based on the flags, that the entries with diagonal fill, i.e., hatching, are to be included in palette table 802. The video decoder may also receive values for one or more new entries to be included in palette table 804 that are not included in input palette predictor 802. In the example of FIG. 8, the video decoder may receive values for each of new colors 806.

As shown in FIG. 9, input palette predictor 802 may be updated based on palette table 804 to generate updated palette predictor 902. For instance, the video decoder may generate updated palette predictor 902 by placing the entries of palette table 804 at the beginning and then "stuffing" the palette predictor with entries from input palette predictor 802 (other than those already included in palette table 804) until a size of updated palette predictor 902 reaches a maximum predictor size. As shown in FIG. 9, not all entries of input palette predictor 802 may be included in updated palette predictor 902.

The palette stuffing, however, may take multiple cycles to complete because the video coder (e.g., encoder/decoder) may need to check sequentially whether each entry in the predictor is used to predict the palette table. After checking predictor entries, filling in the updated color entries will also be sequential process. Since the maximum palette predictor size currently set in Virtual Test Model 6.0 of VVC (VTM6.0) is 63 and the predictors have to be updated before encoding/decoding the next palette coded coding units, for small blocks such as 4×4, 4×8, or 8×4, the palette predictor update process can be a complex, resource intensive procedure, which may result in a bottleneck and introduce latency in the coding pipeline.

This disclosure describes several techniques for reducing the complexity of palette-mode coding, such as palette predictor updating. These techniques may be of particular benefit for small coding units.

In accordance with a first technique of this disclosure, a video coder may predict a palette predictor from a restricted (e.g., limited) set of entries. For instance, the entries in palette predictor that can be used in predicting palette table may be restricted.

In a first example of the first technique, for coding unit (CU) of size W×H, the video coder may only use the first W×H entries in the palette predictor for predicting the palette table in the CU. FIG. 10 is a conceptual diagram illustrating an example of using only the first W×H entries in a palette predictor for predicting the palette predictor. As a result, the number of predictor entries that the encoder or decoder needs to check (whether the element is used for prediction or not) for palette stuffing is reduced to W×H. For predictor entries after the W×H'th position (entries with vertical striped fill, i.e., hatching, in FIG. 10), since the entries are not used for prediction, the elements can be directly copied until the maximum palette size is reached.

In a second example of the first technique, besides restricting the elements that can be used for prediction, the number of elements updated in the predictor is also restricted. For example, as shown in FIG. 11, for coding unit (CU) of size W×H, besides restricting the palette predictor used for predicting to only the first W×H entries in the palette predictor, same as the first example of the first technique, the number of predictor elements allowed to be updated with palette stuffing is also restricted to the first W×H elements. After the W×H's element, the predictor stays the same as the previous one (e.g., the same as the previous predictor).

In accordance with a second technique of this disclosure, the video coder may restrict the maximum size of a palette, such as the palette predictor. In a first example of the second technique, the video coder may dynamically restrict the maximum size of palette predictor to a smaller value, e.g., 32 or 16 (smaller being relative to a default value). In this way, the video coder may reduce the overall cycles needed to complete palette predictor update. Also, in this way, the video coder may reduce the buffer size needed to maintain the palette predictor. In a second example of the second technique, the video coder may restrict the maximum size of palette predictor to a smaller value for small coding units. For example, for block of size W×H smaller than a block size threshold (e.g., 63), the video coder may restrict the maximum size of the updated palette predictor to W×H. For instance, the video coder may selectively restrict the maximum size of a palette predictor based on a block size.

In accordance with a third technique of this disclosure, a video coder may omit or bypass palette predictor stuffing for small coding units. As a first example of the third technique, the video coder may not update the palette predictor for coding units (CUs) of size smaller than the maximum palette predictor size (currently 63 in VTM6.0) or for CUs of size smaller than the current palette predictor size. When the palette predictor is not updated before coding a current CU, the video coder may utilize the same palette predictor as for a previous CU. As a second example of the third technique, the video coder may update the palette predictor to be the palette table of the CU for coding units of size smaller than the maximum palette predictor size (currently 63 in VTM6.0) the palette predictor.

Figure 12:
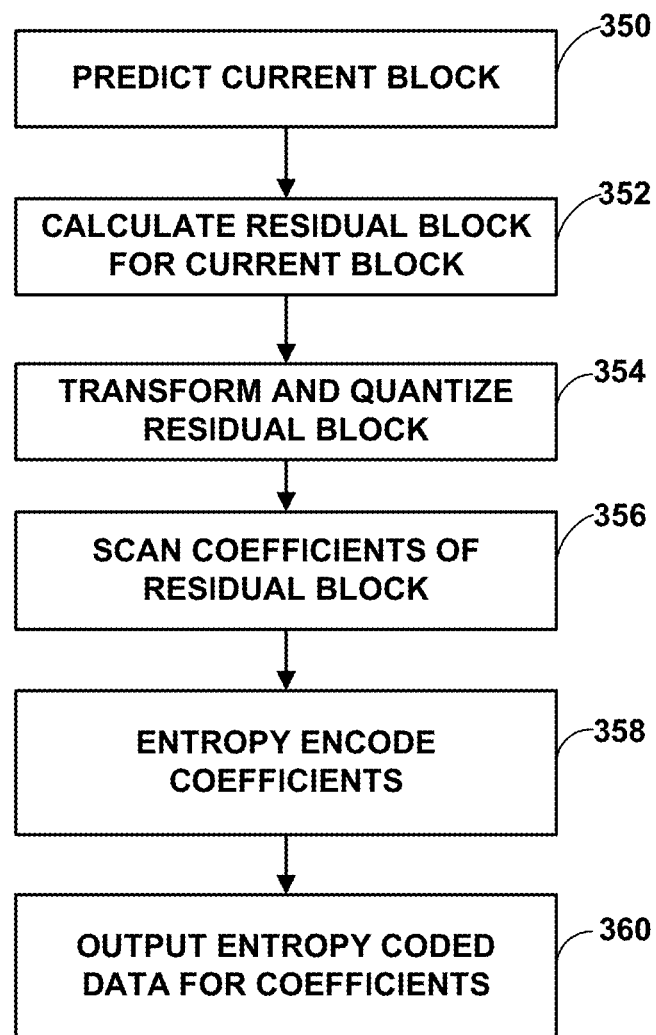
FIG. 12 is a flowchart illustrating an example method for decoding a current block of video data.

FIG. 12 is a flowchart illustrating an example method for encoding a current block. The current block may comprise a current CU. Although described with respect to video encoder 200 (FIGS. 1 and 3), it should be understood that other devices may be configured to perform a method similar to that of FIG. 12.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, uncoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 13:
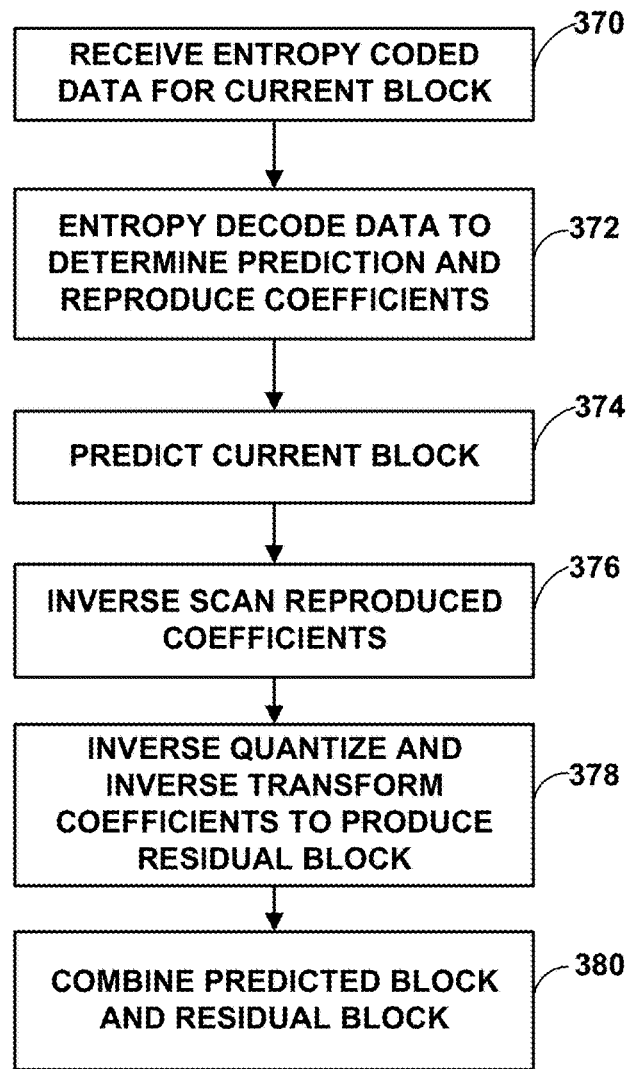
FIG. 13 is a flowchart illustrating an example method for decoding a current block of video data.

FIG. 13 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 13.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

Figure 14:
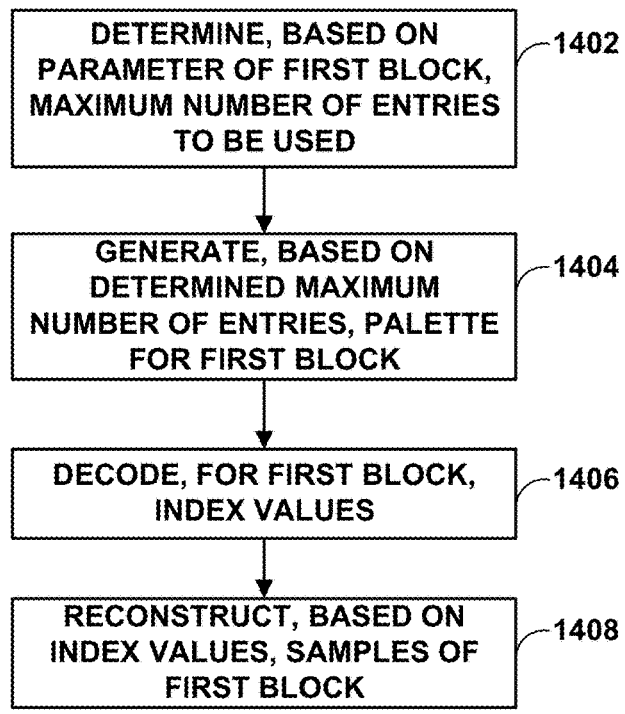
FIG. 14 is a flowchart illustrating an example method for coding a block using palette-mode compression, in accordance with one or more techniques of this disclosure.

FIG. 14 is a flowchart illustrating an example method for coding a block using palette-mode compression, in accordance with one or more techniques of this disclosure. Although described with respect to video decoder 300 (FIGS. 1 and 4), it should be understood that other devices may be configured to perform a method similar to that of FIG. 14. For instance, video encoder 200 may perform the method of FIG. 14.

Video decoder 300 may determine, based on a parameter of a first block of video data, a maximum number of entries to be used for palette-mode coding of the current block (1402). For instance, palette prediction unit 319 of video decoder 300 may determine, based on a value of the parameter, whether to restrict the maximum number of entries to be 16 or 32. In some examples, the parameter may be representative of a size of the first block, e.g., as signaled by an encoder in the encoded bitstream. For instance, palette prediction unit 319 may restrict the maximum number of entries to be W×H where W is a width of the first block and H is a height of the first block. As such, where the first block is 4×4, palette prediction unit 319 may restrict the maximum number of entries to be 16. Similarly, where the first block is 4×8, palette prediction unit 319 may restrict the maximum number of entries to be 32. The determined maximum number of entries may be a maximum number of entries in a palette constructed for the first block, a palette predictor used to construct the palette, or any other palette used for coding of the first block.

Video decoder 300 may generate, based on the determined maximum number of entries and based on a palette predictor, a palette for the first block of video data (1404). The generated palette may include one or more entries each including a palette index that is associated with a color value. To generate the palette based on the determined maximum number of entries, palette prediction unit 319 may limit a number of entries in the palette to the determined maximum number or generate the palette from a palette predictor that includes a number of entries that is limited to the determined maximum number. By limiting the number of entries in the palette to the determined maximum number, the palette may have a number of entries that is less than or equal to the determined maximum number. Similarly, where the palette is generated from a palette predictor that includes a number of entries that is limited to the determined maximum number, the palette predictor may have a number of entries that is less than or equal to the determined maximum number.

Video decoder 300 may decode, from a coded video bitstream and for the first block of video data, index values for samples of the first block that identify entries in the palette (1406). For instance, entropy decoding unit 302 may decode from the encoded video bitstream, and provide to palette prediction unit 319, an array of index values.

Video decoder 300 may reconstruct, based on the index values, the samples of the first block (1408). For instance, palette prediction unit 319 may use the generated palette as a look-up table to translate the index values into color values (e.g., as discussed above with reference to FIGS. 5-7) for respective samples.

Video decoder 300 may update, based on the generated palette, the input palette predictor to generate an updated palette predictor. For instance, palette prediction unit 319 may generate the updated palette predictor as discussed above with reference to FIGS. 8-11. As one example, palette prediction unit 319 may copy, to the updated palette predictor, entries from the palette for the first block; and copy, to the updated palette predictor and at a position that is after the entries from the palette for the first block, entries from a restricted portion of the input palette predictor that are not included in the palette for the first block. In this example, palette prediction unit 319 may copy, to the updated palette predictor and at a position that is after the entries from the restricted portion of the input palette predictor, entries from an unrestricted portion of the input palette predictor until a maximum size of the updated palette predictor is reached. Copying entries from the restriction portion may include copying a limited number of entries from the restricted portion.

As another example, palette prediction unit 319 may copy, to the updated palette predictor, entries from the palette for the first block; and stuff the updated palette predictor with entries of the input palette predictor that are not included in the palette for the first block. In some examples, to stuff the palette, palette prediction unit 319 may stuff the updated palette predictor in response to determining that a size of the first block is greater than a threshold size. Similarly, palette prediction unit 319 may refrain from stuffing the updated palette predictor in response to determining that the size of the first block is less than the threshold size.

Video decoder 300 may generate, based on the updated palette predictor, a palette for a second block of video data. For instance, video decoder 300 may copy one or more entries from the updated palette predictor into the palette for the second block of video data.

The following numbered examples may illustrate one or more aspects of the disclosure:

Example 1. A method of coding video data, the method comprising: obtaining an input palette predictor; generating, based on the input palette predictor, a palette for a first block of video data; updating, based on the generated palette, the input palette predictor to generate an updated palette predictor, wherein updating the input palette predictor comprises: copying, to the updated palette predictor, entries from the palette for the first block; and copying, to the updated palette predictor and at a position that is after the entries from the palette for the first block, entries from a restricted portion of the input palette predictor that are not included in the palette for the first block; and generating, based on the updated palette predictor, a palette for a second block of video data.

Example 2. The method of example 1, wherein updating the input palette predictor further comprises: copying, to the updated palette predictor and at a position that is after the entries from the restricted portion of the input palette predictor, entries from an unrestricted portion of the input palette predictor until a maximum size of the updated palette predictor is reached.

Example 3. The method of any of examples 1 or 2, wherein the entries from the restricted portion comprises: copying a limited number of entries from the restricted portion.

Example 4. A method of coding video data, the method comprising: obtaining an input palette predictor, wherein a size of the input palette predictor is restricted to a value less than 63; generating, based on the input palette predictor, a palette for a first block of video data; updating, based on the generated palette, the input palette predictor to generate an updated palette predictor; and generating, based on the updated palette predictor, a palette for a second block of video data.

Example 5. The method of example 4, wherein the value is 32.

Example 6. The method of example 4, wherein the value is 16.

Example 7. The method of any of examples 4-6, further comprising: restricting the size of the input palette predictor responsive to determining that a size of the first block is less than a threshold block size.

Example 8. The method of example 7, wherein restricting the size of the input palette predictor comprises restricting the size of the input palette predictor to a size equal to a length times a width of the first block.

Example 9. A method of coding video data, the method comprising: obtaining an input palette predictor; generating, based on the input palette predictor, a palette for a first block of video data; updating, based on the generated palette, the input palette predictor to generate an updated palette predictor, wherein updating the input palette predictor comprises: copying, to the updated palette predictor, entries from the palette for the first block; and stuffing the updated palette predictor with entries of the input palette predictor that are not included in the palette for the first block; and generating, based on the updated palette predictor, a palette for a second block of video data.

Example 10. The method of example 9, wherein stuffing the palette comprises stuffing the updated palette predictor in response to determining that a size of the first block is greater than a threshold size.

Example 11. The method of example 10, further comprising not stuffing the updated palette predictor in response to determining that the size of the first block is less than the threshold size.

Example 12. A method comprising the method of any of examples 1-11.

Example 13. The method of any of examples 1-12, wherein the first block is a first coding unit (CU) of video data.

Example 14. The method of any of examples 1-13, wherein coding comprises decoding.

Example 15. The method of any of examples 1-14, wherein coding comprises encoding.

Example 16. A device for coding video data, the device comprising one or more means for performing the method of any of examples 1-15.

Example 17. The device of example 16, wherein the one or more means comprise one or more processors implemented in circuitry.

Example 18. The device of any of examples 16 and 17, further comprising a memory to store the video data.

Example 19. The device of any of examples 16-18, further comprising a display configured to display decoded video data.

Example 20. The device of any of examples 16-19, wherein the device comprises one or more of a camera, a computer, a mobile device, a broadcast receiver device, or a set-top box.

Example 21. The device of any of examples 16-20, wherein the device comprises a video decoder.

Example 22. The device of any of examples 16-21, wherein the device comprises a video encoder.

Example 23. A computer-readable storage medium having stored thereon instructions that, when executed, cause one or more processors to perform the method of any of examples 1-15.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for decoding video data, the device comprising
    a memory configured to store at least a portion of an encoded video bitstream; and
    one or more processors that are implemented in circuitry and configured to:
        dynamically select, based on a parameter of a first block of video data, a maximum number of entries to be used for palette-mode coding of the current block to only be either 16 or 32, wherein, to dynamically select the maximum number of entries, the one or more processors are configured to:
            select the maximum number of entries to be 16 responsive to the parameter having a first value; and
            select the maximum number of entries to be 32 responsive to the parameter having a second value that is different than the first value;
        generate, based on the determined maximum number of entries and based on a palette predictor, a palette for the first block of video data, the palette including one or more entries each including a palette index that is associated with a color value;
        decode, from the encoded video bitstream and for the first block of video data, index values for samples of the first block that identify entries in the palette; and
        reconstruct, based on the index values, the samples of the first block.

2. The device of claim 1, wherein the one or more processors are further configured to:
    obtain an input palette predictor, wherein, to generate the palette, the one or more processors are configured to generate the palette based on the input palette predictor;
    update, based on the generated palette, the input palette predictor to generate an updated palette predictor, wherein, to update the input palette predictor, the one or more processors are configured to:
        copy, to the updated palette predictor, entries from the palette for the first block; and
        copy, to the updated palette predictor and at a position that is after the entries from the palette for the first block, entries from a restricted portion of the input palette predictor that are not included in the palette for the first block; and
    generate, based on the updated palette predictor, a palette for a second block of video data.

3. The device of claim 2, wherein, to update the input palette predictor, the one or more processors are configured to:
    copy, to the updated palette predictor and at a position that is after the entries from the restricted portion of the input palette predictor, entries from an unrestricted portion of the input palette predictor until a maximum size of the updated palette predictor is reached.

4. The device of claim 3, wherein, to copy the entries from the restricted portion, the one or more processors are configured to:
    copy a limited number of entries from the restricted portion.

5. The device of claim 1, wherein the one or more processors are further configured to:
    obtain an input palette predictor, wherein, to generate the palette, the one or more processors are configured to generate the palette based on the input palette predictor;
    update, based on the generated palette, the input palette predictor to generate an updated palette predictor, wherein, to update the input palette predictor, the one or more processors are configured to:
        copy, to the updated palette predictor, entries from the palette for the first block; and
        stuff the updated palette predictor with entries of the input palette predictor that are not included in the palette for the first block; and
    generate, based on the updated palette predictor, a palette for a second block of video data.

6. The device of claim 5, wherein, to stuff the palette, the one or more processors are configured to stuff the updated palette predictor in response to determining that a size of the first block is greater than a threshold size.

7. The device of claim 6, wherein, to stuff the palette, the one or more processors are configured to not stuff the updated palette predictor in response to determining that the size of the first block is less than the threshold size.

8. The device of claim 1, further comprising a display configured to output the reconstructed first block of video data.

9. A method of decoding video data, the method comprising:
    dynamically select, based on a parameter of a first block of video data, a maximum number of entries to be used for palette-mode coding of the current block to only be either 16 or 32, wherein dynamically selecting the maximum number of entries comprises:
        selecting the maximum number of entries to be 16 responsive to the parameter having a first value; and selecting the maximum number of entries to be 32 responsive to the parameter having a second value that is different than the first value;

generating, based on the determined maximum number of entries and based on a palette predictor, a palette for the first block of video data, the palette including one or more entries each including a palette index that is associated with a color value;

decoding, from an encoded video bitstream and for the first block of video data, index values for samples of the first block that identify entries in the palette; and reconstructing, based on the index values, the samples of the first block.

10. The method of claim 9, further comprising:

obtaining an input palette predictor, wherein generating the palette comprises generating the palette based on the input palette predictor;

updating, based on the generated palette, the input palette predictor to generate an updated palette predictor, wherein updating the input palette predictor comprises:
copying, to the updated palette predictor, entries from the palette for the first block; and
copying, to the updated palette predictor and at a position that is after the entries from the palette for the first block, entries from a restricted portion of the input palette predictor that are not included in the palette for the first block; and generating, based on the updated palette predictor, a palette for a second block of video data.

11. The method of claim 10, wherein updating the input palette predictor further comprises:

copying, to the updated palette predictor and at a position that is after the entries from the restricted portion of the input palette predictor, entries from an unrestricted portion of the input palette predictor until a maximum size of the updated palette predictor is reached.

12. The method of claim 11, wherein copying the entries from the restricted portion comprises:

copying a limited number of entries from the restricted portion.

13. The method of claim 9, further comprising:

obtaining an input palette predictor, wherein generating the palette comprises generating the palette based on the input palette predictor;

updating, based on the generated palette, the input palette predictor to generate an updated palette predictor, wherein updating the input palette predictor comprises:
copying, to the updated palette predictor, entries from the palette for the first block; and
stuffing the updated palette predictor with entries of the input palette predictor that are not included in the palette for the first block; and generating, based on the updated palette predictor, a palette for a second block of video data.

14. The method of claim 13, wherein stuffing the palette comprises stuffing the updated palette predictor in response to determining that a size of the first block is greater than a threshold size.

15. The method of claim 14, further comprising not stuffing the updated palette predictor in response to determining that the size of the first block is less than the threshold size.

16. A device for encoding video data, the device comprising a memory configured to store at least a portion of an encoded video bitstream; and one or more processors that are implemented in circuitry and configured to:

dynamically select, based on a parameter of a first block of video data, a maximum number of entries to be used for palette-mode coding of the current block to only be either 16 or 32, wherein, to dynamically select the maximum number of entries, the one or more processors are configured to:
select the maximum number of entries to be 16 responsive to the parameter having a first value; and
select the maximum number of entries to be 32 responsive to the parameter having a second value that is different than the first value;

generate, based on the determined maximum number of entries and based on a palette predictor, a palette for the first block of video data, the palette including one or more entries each including a palette index that is associated with a color value; and encode, in the encoded video bitstream and for the first block of video data, index values for samples of the first block that identify entries in the palette.

17. A method of encoding video data, the method comprising:

dynamically select, based on a parameter of a first block of video data, a maximum number of entries to be used for palette-mode coding of the current block to only be either 16 or 32, wherein dynamically selecting the maximum number of entries comprises:
selecting the maximum number of entries to be 16 responsive to the parameter having a first value; and
selecting the maximum number of entries to be 32 responsive to the parameter having a second value that is different than the first value;

generating, based on the determined maximum number of entries and based on a palette predictor, a palette for the first block of video data, the palette including one or more entries each including a palette index that is associated with a color value; and encoding, in an encoded video bitstream and for the first block of video data, index values for samples of the first block that identify entries in the palette.

18. A computer-readable storage medium having stored thereon instructions that, when executed, cause one or more processors of a video decoder to:

dynamically select, based on a parameter of a first block of video data, a maximum number of entries to be used for palette-mode coding of the current block to only be either 16 or 32, wherein, the instructions that cause the one or more processors to dynamically select the maximum number of entries comprise instructions that cause the one or more processors to:
select the maximum number of entries to be 16 responsive to the parameter having a first value; and
select the maximum number of entries to be 32 responsive to the parameter having a second value that is different than the first value;

generate, based on the determined maximum number of entries and based on a palette predictor, a palette for the first block of video data, the palette including one or more entries each including a palette index that is associated with a color value;

decode, from an encoded video bitstream and for the first block of video data, index values for samples of the first block that identify entries in the palette; and reconstruct, based on the index values, the samples of the first block.

19. A computer-readable storage medium having stored thereon instructions that, when executed, cause one or more processors of a video encoder to:
- dynamically select, based on a parameter of a first block of video data, a maximum number of entries to be used for palette-mode coding of the current block to only be either 16 or 32, wherein, the instructions that cause the one or more processors to dynamically select the maximum number of entries comprise instructions that cause the one or more processors to:
  - select the maximum number of entries to be 16 responsive to the parameter having a first value; and
  - select the maximum number of entries to be 32 responsive to the parameter having a second value that is different than the first value;
- generate, based on the determined maximum number of entries and based on a palette predictor, a palette for the first block of video data, the palette including one or more entries each including a palette index that is associated with a color value; and
- encode, in an encoded video bitstream and for the first block of video data, index values for samples of the first block that identify entries in the palette.

\* \* \* \* \*